United States Patent [19]

Abe et al.

[11] Patent Number: 5,276,574
[45] Date of Patent: Jan. 4, 1994

[54] MAGNETIC HEAD

[75] Inventors: Mitsuo Abe, Odawara; Yukiko Ogura; Masakatsu Saito, both of Yokohama; Toshio Tsuchiya, Sagamihara, all of Japan

[73] Assignee: Hitachi, Ltd., Tokyo, Japan

[21] Appl. No.: 744,515

[22] Filed: Aug. 13, 1991

[30] Foreign Application Priority Data

Aug. 20, 1990 [JP] Japan ............... 2-217192

[51] Int. Cl.⁵ .............. G11B 5/187; G11B 5/255
[52] U.S. Cl. ....................... 360/126; 360/122
[58] Field of Search ..................... 360/122, 126

[56] References Cited

U.S. PATENT DOCUMENTS

| | | | |
|---|---|---|---|
| 4,681,813 | 7/1987 | Yamada et al. | 428/450 |
| 4,803,581 | 2/1989 | Kira et al. | 360/113 |
| 5,057,959 | 10/1991 | Inoue et al. | 360/126 |

FOREIGN PATENT DOCUMENTS 53-102723 9/1978 Japan ............... 360/126
1-102713 4/1989 Japan.

OTHER PUBLICATIONS

A. Broese van Groenon, H. J. J. C. Meulenbroeks and M. de Jongh, "Level Differences in Hybrid Heads After Contact With Various Tapes", *IEEE Transactions on Magnetics,* vol. 26, No. 1, (Jan. 1990), pp. 153-155, Copyright ©1990 IEEE.

*Primary Examiner*—Constantine Hannaher
*Attorney, Agent, or Firm*—Antonelli, Terry, Stout & Kraus

[57] ABSTRACT

Disclosed herein is a magnetic head in which the sliding surface is constructed of a transducing gap, a pair of soft magnetic metal films opposite to each other through the transducing gap, and a substrate holding the soft magnetic metal film. The substrate is 20-200 times as wear-resistant as the soft magnetic metal film. The magnetic head has a gap depth of 1-5 μm and produces an overall high head output.

18 Claims, 2 Drawing Sheets

MAGNETIC HEAD

BACKGROUND OF THE INVENTION

The present invention relates to a composite-type magnetic head which is built up of a soft magnetic metal film and a magnetic or non-magnetic substrate supporting it.

The recent introduction of high-coercivity tapes have necessitated the development of magnetic heads which employ a soft magnetic metal film having a high saturation magnetic flux density. These magnetic heads are constructed such that a soft magnetic metal film is held between high wear-resistance magnetic or non-magnetic substrates, so that they are subject to less wear by sliding travel and have a longer wear life.

A composite-type magnetic head suffers so-called level difference (due to the unbalanced wear that occurs at the boundary between different materials) unless the materials constituting the head sliding surface have the same wear characteristics. The level difference leads to an increased spacing loss at the time of recording and playback.

A conventional countermeasure to cope with the level difference is to constitute the head sliding surface with materials having the same wear characteristics. An example of this countermeasure is disclosed in Japanese Patent Laid-open No. 1-102713. According to this disclosure, a proper amount of $Bi_2O_3$ is added to the major component ($\alpha$-$Fe_2O_3$) for the substrate (thereby to lower its wear resistance) so that the substrate has the same wear characteristics as the soft magnetic metal film made of amorphous alloy or sendust (Fe-Al-Si alloy) to thereby obtain a magnetic head having a small level difference namely a low spacing loss.

Although the addition of $Bi_2O_3$ reduces the level difference, it also increases the wear rate of the substrate and hence aggravates the wear resistance of the head as a whole. For the magnetic head to have a desired life in this situation, it is necessary to increase the gap depth excessively. However, the increased gap depth lowers the magnetic circuit efficiency and hence offsets the effect of reducing the spacing loss due to the level difference. Incidentally, the magnetic circuit efficiency is defined by the ratio of the magnetic flux of tapes which passes through the head coil when the magnetic head is represented by an equivalent magnetic circuit with magnetic reluctance.

There is another approach to the elimination of level difference. In this case, the substrate is made of a wear-resistant material and the soft magnetic metal film is made to have a high wear resistance comparable to that of the substrate. It is reported that it is possible to improve the wear characteristics of the soft magnetic metal film by the incorporation of nitrogen. However, the improvement by this means is not satisfactory for practical use. In fact, the wear rate of the soft magnetic metal film is still nearly ten times that of the substrate.

SUMMARY OF THE INVENTION

The present invention was completed in view of the above-foregoing. It is an object of the present invention to provide a magnetic head which has an improved overall head output. This magnetic head is subject to a certain degree of inevitable level difference due to the wear characteristics of the existing material; but the spacing loss due to level difference is offset by the great improvement in magnetic circuit efficiency.

The above-mentioned object is achieved by a magnetic head which has a pair of soft magnetic metal films opposite to each other through a transducing gap, at least one of the soft magnetic metal films being held by substrates made of a magnetic or non-magnetic material whose wear resistance is 20-200 times that of the soft magnetic metal film (namely, the wear resistance ratio N of the material to the film is 20-200). This magnetic head has a gap depth (Gd) of 1-5 $\mu$m. Needless to say, this magnetic head has coils.

The head performance is determined as follows by the ratio (N) of the wear resistance of the substrate to the wear resistance of the soft magnetic metal film.

(1) The wear rate of the head decreases by the factor of 1/N, and it is possible to decrease the gap depth (Gd) accordingly. This leads to an increase in magnetic circuit efficiency ($\eta$). Experimental results indicate that when N is 10, $\eta$ is 0.67, and when N is 100, $\eta$ is 0.95.

(2) The results of the present inventors' experiments indicate that the level difference ($\Delta$d) occurs in proportion to log N and aggravates the spacing loss (Ld). For example, when N is 10, Ld is 0.81, and when N is 100, Ld is 0.66.

The overall head output is determined by these two factors of items (1) and (2) mentioned above. The product ($\eta \cdot$Ld) reaches the maximum value when the wear resistance ratio (N) is in the range of 20 to 200. In this case, the gap depth (Gd) is 1-5 $\mu$m.

In the case of a gap depth (Gd) smaller than 1 $\mu$m, it is difficult to maintain the accuracy in the production and inspection of the head. Even though the gap depth (Gd) is reduced from 1 $\mu$m to 0 $\mu$m, the increase in magnetic circuit efficiency is only 0.4 dB or less. On the other hand, a gap depth (Gd) greater than 5 $\mu$m is unnecessary from the standpoint of wear even when N is 20. In addition, such a great gap depth (Gd) considerably lowers the magnetic circuit efficiency ($\eta$).

For reasons mentioned above, in the present invention, the ratio (N) of the wear resistance of the substrate to the wear resistance of the soft magnetic metal film should be 20 to 200 and the gap depth (Gd) should be 1-5 $\mu$m.

As mentioned above, the magnetic head of the present invention has a pair of soft magnetic metal films of high saturation magnetic flux density which are opposite to each other through a transducing gap. As such soft magnetic metal film, for example, there can be quoted Co-based amorphous magnetic alloy such as $Co_{81-86}Nb_{11-14}Zr_{3-5}$ and $Co_{86-89}Ta_{6.5-9.0}Zr_{3.5-5.5}$, microcrystalline Fe-C magnetic material such as $Fe_{65-85}Ta_{5-15}C_{10-20}$ and $Fe_{60-80}Nb_{5-20}C_{10-20}$, and sendust $Fe_{85-88}Al_{4-6}Si_{8-10}$. However, it is not necessary to limit it to these alloys. The composition of these alloys is expressed in terms of at % except for sendust whose composition is expressed in wt %. The soft magnetic metal film of high saturation magnetic flux density is replacing the conventional high permeability ferrite because of its higher saturation density.

According to the present invention, the substrate should be 20 to 200 times as wear resistant as the soft magnetic metal film. As such substrate material, for example, there can be quoted $MnNiO_2$, $\alpha$—$Fe_2O_3$, and $ZrO_2$ However, it is not necessary to limit to these materials.

Additional examples of the materials for the soft magnetic metal film include microcrystalline Fe—N magnetic material and permalloy (Fe-Ni alloy containing 35-80 wt % Ni). As to the substrate material having the wear resistance ratio N of 20-200, the former material matches the substrate of, for example, $MnNiO_2$, $\alpha$—$Fe_2O_3$, or $ZrO_2$, and the latter material matches the substrate of, for example, single-crystalline MnZn ferrite, $MnNiO_2$, or $\alpha$—$Fe_2O_3$.

The magnetic head of the present invention relates to the level difference that occurs on the surface facing the magnetic recording medium. Therefore, the present invention is not directed to the case where there is no possibility of level difference. For example, it is not directed to the magnetic head for the hard disk of a computer which is designed for float travel and hence is free of wear, and, accordingly, level difference.

The magnetic head of the present invention is suited for a magnetic recording medium such as magnetic tape intended for contact sliding. Contact sliding inevitably brings about level difference whose amount is determined by the formula (4) given later according to the materials and the like of the head and tape. The magnetic head of the present invention is a system for employing in a level difference occurring condition.

The magnetic head of the present invention is of contact sliding type in which the soft magnetic metal films supported by the substrate oppose to each other through the transducing gap and in which the surface facing the magnetic recording medium experiences a certain amount of level difference due to the contact sliding with the magnetic recording medium. In the present invention, the conventional technology in this field can be employed except that the substrate is 20-200 times as wear-resistant as the soft magnetic metal film and the gap depth (Gd) is 1-5 $\mu$m.

DESCRIPTION OF THE PREFERRED EMBODIMENTS

Example 1

Figure 1:
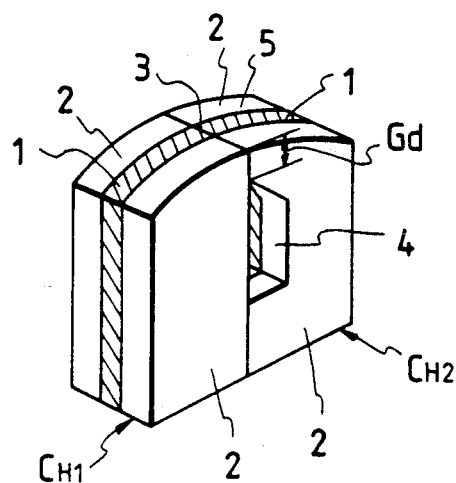
FIG. 1 is a perspective view of the magnetic head according to an embodiment of the present invention.
Figure 2:
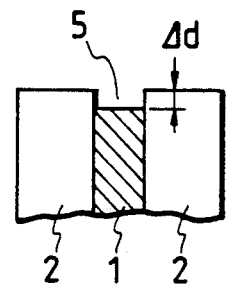
FIG. 2 is a sectional view showing the part of the level difference in the magnetic head according to an embodiment of the present invention.

A perspective view and a sectional view of the important portion, of the magnetic head of the present invention are shown in FIG. 1 and FIG. 2 respectively. In FIG. 1, there are shown paired core halves ($C_{H1}$ and $C_{H2}$), each of which is built up of a soft magnetic metal film 1 of high saturation magnetic flux density and substrates 2 which hold the soft magnetic metal film sandwiched between them. The soft magnetic metal film was made of Co-based amorphous magnetic alloy represented by $Co_{83.5}Nb_{12.4}Zr_{4.1}$ or $Co_{87.1}Ta_{8.9}Zr_{4.0}$ (in at %), microcrystalline Fe—C magnetic material represented by $Fe_{77}Ta_9C_{14}$ (in at %), or sendust represented by $Fe_{85.3}Al_{15.8}Si_{8.9}$ (in wt %).

The core halves ($C_{H1}$ and $C_{H2}$) are constructed such that at least the two soft magnetic metal films (1 and 1) at the front side are made opposite to each other, through a gap-forming thin film interposed between them. Also, the core halves $C_{H1}$, $C_{H2}$ are bonded to each other with bonding glass (not shown in FIGS. 1 and 2).

The gap-forming thin film constituting the transducing gap 3 is an $SiO_2$ film of 0.2-0.3 $\mu$m in thickness. The transducing gap 3 projects only slightly (about 5-10 nm) from the surrounding soft magnetic metal film 1. It has a negligible effect on the characteristics of the head because of its extremely small area.

In FIG. 1, there are shown the winding window 4 and the sliding surface 5, and Gd denotes the gap depth. Needless to say, the winding window 4 facilitates coil winding. (Coil is not shown in FIG. 1.)

FIG. 2 is a sectional view of the worn head cut near the transducing gap 3 in the direction parallel to it. There is formed a level difference ($\Delta$d) in the sliding surface 5 so that there occurs a hollow of the soft magnetic metal film 1 on account of the sliding by the relative travelling with the tape.

Figure 3:
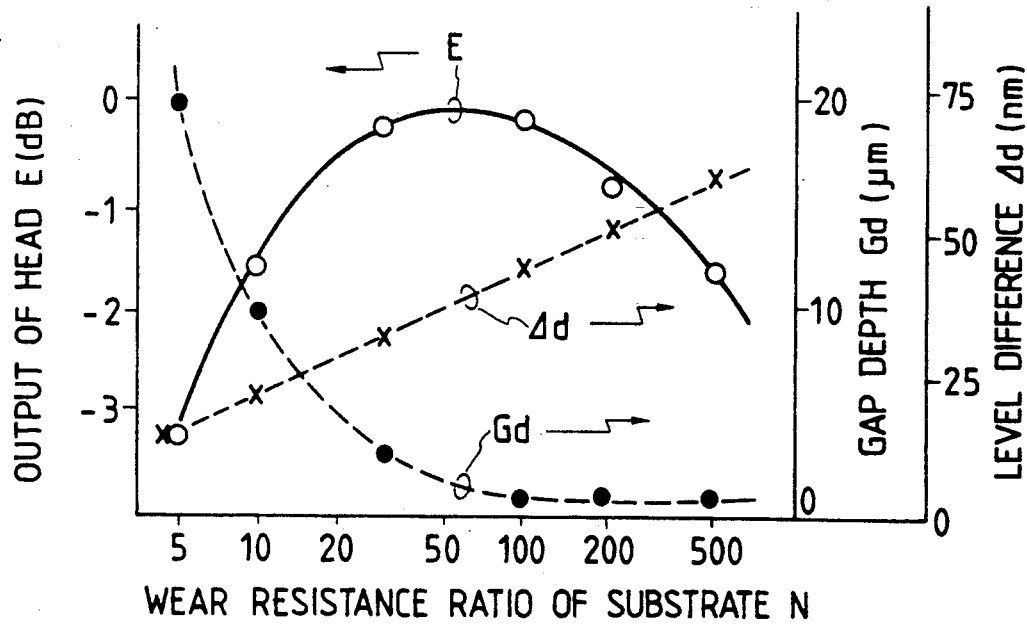
FIG. 3 is a graph showing the relationship among the gap depth (Gd), the amount of level difference ($\Delta$d), the head output (E), and the wear resistance ratio (N)

The magnetic head as shown in FIGS. 1 and 2 was tested for the relationship between the level difference and head output by making the substrate 2 from various materials which differ in wear properties. Table 1 shows the materials used for the substrate and their wear resistance ratio (N), gap depth (Gd) required, and head output (E). FIG. 3 shows the dependence on the wear resistance ratio (N) of the gap depth (Gd), the level difference ($\Delta$d), and the head output (E). The measurements were made using a metal tape at a relative speed of 3.75 m/s and a frequency of 5 MHz.

The data shown in Table 1 and FIG. 3 was obtained in the case where the soft magnetic metal film was made of $Co_{83.5}Nb_{12.4}Zr_{4.1}$ (in at %) and the magnetic tape was run for 100 hours. The level difference ($\Delta$d) reached the maximum value after tape running for 10-50 hours, and remained at the steady state maintaining the same level afterward.

TABLE 1

| | Materials of substrate | Wear resistance ratio (N) | Gap depth (Gd), $\mu$m | Head output (E) (relative value) |
|---|---|---|---|---|
| A* | Crystallized glass | 5 | 20 | 80 |
| B* | Ferrite | 10 | 10 | 100 |
| C* | MnNiO | 30 | 3 | 117 |
| D | $\alpha$-$Fe_2O_3$ | 100 | 1 | 117 |
| E | $ZrO_2$ | 200 | 1 | 110 |
| F | $Al_2O_3$ | 500 | 1 | 103 |

*A: $Li_2O.Al_2O_3.SiO_2$
*B: Single-crystalline MnZn ferrite
*C: $MnNiO_2$

In Table 1 and FIG. 1, the head output (E) is represented in terms of relative values, that is, in Table 1, the head output for ferrite is regarded as the reference (100 $\mu$V), and in FIG. 3, the maximum value of the head output, which is obtained when the value of N is close to 50, is regarded as the reference (0 dB).

The above-mentioned experimental results indicate that the head output is high when the materials designated as C, D, and E in Table 1 are used. It is noted from FIG. 3 that a material having a wear resistance ratio (N) of 20-200 is adequate if the peak output is allowed to decrease by 1 dB.

In general, the gap depth (Gd) is designed so as to exceed the value of the wear amount in depth occurring within the lifetime required for the head (namely the tape travelling time until the end of the life). In other words, the gap depth (Gd) is established such that the surface facing the magnetic recording medium does not wear out up to the winding window within the required life of the magnetic head.

In this example, the gap depth was established so that the magnetic head has a life of 2000 hours like the existing ferrite head. To establish the gap depth, the wear resistance ratio (N) of the material for the substrate was experimentally measured and the gap depth was calculated so that it is inversely proportional to the value of N. If the calculated gap depth was smaller than 1 $\mu$m, the actual gap depth was regarded as 1 $\mu$m. A gap depth smaller than 1 $\mu$m is impractical and a practically minimum gap depth is 1 $\mu$m. The calculation of the gap depth which is inversely proportional to the wear resistance ratio (N) is based on the assumption that the ferrite head (whose N is 10) wears as much as 10 $\mu$m after tape running for 2000 hours.

The foregoing is interpreted by employing the following formula expressions.

(i) The magnetic circuit efficiency ($\eta$) is determined by the magnetic resistance of each part constituting the head, and the dependence of the gap depth (Gd) is expressed by equation (1) below.

$$\eta = 1/(1 + A \cdot Gd) \quad (1)$$

where $A = 0.05 \, \mu m^{-1}$, which is a constant obtained by experiments, and Gd is inversely proportional to the wear resistance ratio (N).

Equation (1) may be written as equation (2) below.

$$\eta = 1/(1 + A'/N) \quad (2)$$

where $A' = 5$, assuming that $Gd = 10 \, \mu m$ when $N = 10$.

(ii) The spacing loss (Ld) due to the level difference ($\Delta d$) is expressed by equation (3) below.

$$Ld = \exp(-2\pi \Delta d/\lambda) \quad (3)$$

where $\lambda$ is a recording wave length, which is about 0.7 $\mu$m at 3.75 m/s and 5 MHz.

Both Ld and $\eta$ are dimensionless numbers as indicated by equations (1), (2), and (3), and their maximum value is 1.

The results of the present inventors' experiments indicate that the relationship between the level difference ($\Delta d$) and the wear resistance ratio (N) is expressed by equation (4) below.

$$d = C \log N \quad (4)$$

where C is a constant of about 10 nm, which depends on tape deformation.

The product of the magnetic circuit efficiency ($\eta$) and the spacing loss (Ld) determines the total head output (E), which is expressed by equation (5) below.

$$E = \eta \cdot Ld = 1/(1 + A'/N) \cdot N^{2\pi C/\lambda} \quad (5)$$

The head output E becomes maximum under the conditions defined by equation (6) below.

$$N = A'(1 - 2\pi C/\lambda)/2\pi C/\lambda \quad (6)$$

According to equation (6), $N = 50$ when $A' = 5$, $C = 10$ nm, and $\lambda = 0/7 \, \mu m$.

Now, it has been theoretically proved that there is a condition for obtaining the maximum head output (E) in the region of N of greater than 1.

According to equation (5), the head output (E) takes the relative value of 1 when both Ld and $\eta$ are 1 (or when there is no loss and the efficiency is 100%). It is to be noted that equation (5) agrees closely with the experimental values of E shown in FIG. 3.

Example 2

Figure 4:
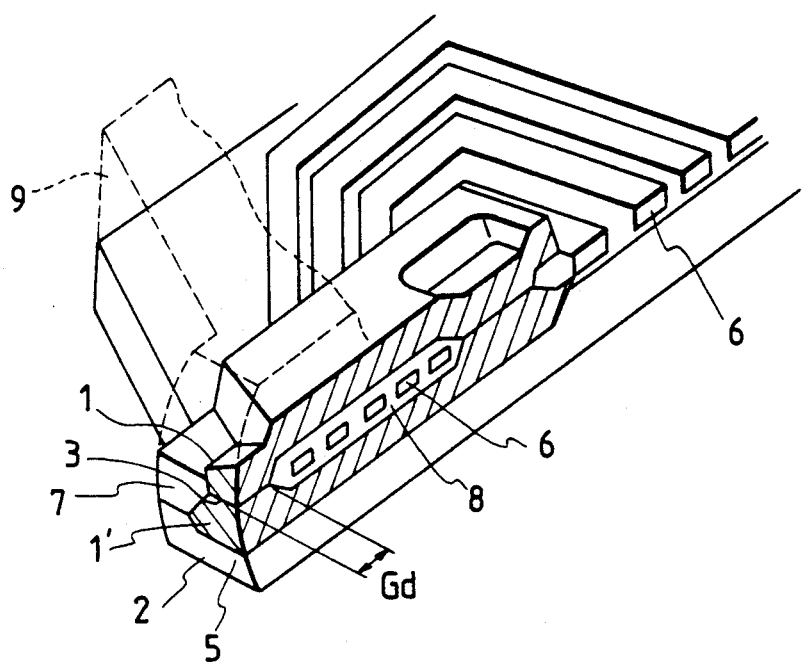
FIG. 4 is a partly cutaway perspective view showing the major part of the magnetic head in another embodiment of the present invention.

A magnetic head was prepared as shown in FIG. 4 which is a perspective view of the partly cutaway major part. The magnetic head is made up of a substrate 2, soft magnetic metal films 1 and 1' formed on the substrate, and a copper signal coil 6 in the form of thin film. The substrate is made of $\alpha$—Fe$_2$O$_3$ or the like which has a wear resistance ratio (N) of 20-200. The soft magnetic metal film is made of Co—Nb—Zr amorphous magnetic alloy or the like. An advantage of this magnetic head is that it has an improved overall head output as in Example 1. Another advantage of this magnetic head is that it permits easily the accurate control of a gap depth as small as 1-5 $\mu$m by virtue of the thin film patterning technique employed in its production.

The production method employed in this example is explained in the following. On a substrate of $\alpha$—Fe$_2$O$_3$, there were formed a lamination by sputtering consecutively in the following order, a lower soft magnetic metal film 1' of Co—Nb—Zr amorphous magnetic alloy, a signal coil 6 of copper, a transducing gap 3 of SiO$_2$, an upper soft magnetic metal film 1 of Co—Nb—Zr amorphous magnetic alloy, and a protective film 9 of forsterite. The part of each material formed as mentioned above was patterned to a desired shape by the ion milling method and filled with a non-magnetic filler 7 of forsterite and an insulating material 8 of SiO$_2$. Incidentally, the sliding surface 5 is constructed of a substrate 2, soft magnetic metal films 1 and 1', a protective film 9, a filler 7, and a transducing gap 3.

In the meantime, the magnetic head of the present invention may have a substrate of either magnetic material or non-magnetic material and may have a structure of any known metal-in-gap (MIG) type As mentioned above, the magnetic head of the present invention is characterized by that the substrate is 20-200 times as wear-resistant as the soft magnetic metal film. This feature can decrease the gap depth to offset the disadvantage of the spacing loss due to level difference, and further increase the overall head output.

What is claimed is:

1. A magnetic head comprising a sliding surface constructed of at least a soft magnetic metal film and a substrate supporting it, characterized in that the substrate is 20-200 times as wear-resistant as the soft magnetic metal film.

2. A magnetic head as claimed in claim 1, which has a gap depth of 1-5 $\mu$m.

3. A magnetic head as claimed in claim 1, in which said soft magnetic metal film and a signal coil in a form of thin film are formed on said substrate.

4. A magnetic head comprising a pair of soft magnetic metal films opposite to each other through a transducing gap, at least one of said soft magnetic metal films being supported by a substrate, wherein said soft magnetic metal film, said substrate, and said transducing gap form a sliding surface, said substrate being 20-200 times as wear-resistant as said soft magnetic metal film.

5. A magnetic head as claimed in claim 4, which has a gap depth of 1-5 μm.

6. A magnetic head as claimed in claim 4, wherein the soft magnetic metal film is made of one magnetic alloy selected from the group consisting of Co-based amorphous magnetic alloy, Fe-C-based microcrystalline magnetic alloy, Fe-N-based microcrystalline magnetic alloy, Fe-Si-Al-based magnetic alloy, and Fe-Ni-based magnetic alloy.

7. A magnetic head as claimed in claim 4, wherein the substrate is made of one material selected from the group consisting of single-crystalline MnZn ferrite, $MnNiO_2$, $\alpha$-$Fe_2O_3$, and $ZrO_2$.

8. A magnetic head as claimed in claim 4, wherein the soft magnetic metal film is made of one magnetic alloy selected from the group consisting of Co-based amorphous magnetic alloy, Fe-C-based microcrystalline magnetic alloy, Fe-N-based microcrystalline magnetic alloy, and Fe-Si-Al-based magnetic alloy, and the substrate is made of one material selected from the group consisting of $MnNiO_2$, $\alpha$—$FeO_2O_3$, and $ZrO_2$.

9. A magnetic head as claimed in claim 4, wherein the soft magnetic metal film is made of Fe-Ni-based magnetic alloy and the substrate is made of one material selected from the group consisting of single-crystalline MnZn ferrite, $MnNiO_2$, and $\alpha$—$Fe_2O_3$.

10. A magnetic head as claimed in claim 4, which has a signal coil in the form of thin film.

11. A magnetic head as claimed in claim 4, wherein the soft magnetic metal film is made of one magnetic alloy selected from the group consisting of Co-based amorphous magnetic alloy, microcrystalline Fe-C-based magnetic alloy and Fe-Si-Al-based magnetic alloy, said Co-based amorphous magnetic alloy being one selected from the group consisting of $Co_{81-86}Nb_{11-14}Zr_{3-5}$ and $Co_{86-89}Ta_{6.5-9.0}Zr_{3.5-5.5}$, aid microcrystalline Fe—C-based magnetic alloy being one selected from the group consisting of $Fe_{65-85}Ta_{5-15}C_{10-20}$ and $Fe_{60-80}Nb_{5-20}C_{10-20}$, and said Fe-Si-Al-based magnetic alloy being $Fe_{85-88}Al_{4-6}Si_{8-10}$.

12. A magnetic head comprising a pair of soft magnetic metal films opposite to each other through a transducing gap, at least one of said soft magnetic metal films being supported by a substrate, wherein said soft magnetic metal film, said substrate, and said transducing gap form a sliding surface, a boundary between said soft magnetic metal film and said substrate experiences a certain amount of level difference, said substrate is 20-200 times as wear-resistant as said soft magnetic metal film, and said magnetic head has a gap depth of 1-5 μm.

13. A magnetic head as claimed in claim 12, wherein the soft magnetic metal film is made of one magnetic alloy selected from the group consisting of Co-based amorphous magnetic alloy, Fe—C-based microcrystalline magnetic alloy, Fe-N-based microcrystalline magnetic alloy, Fe—Si—Al-based magnetic alloy, and Fe—Ni-based magnetic alloy.

14. A magnetic head as claimed in claim 12, wherein the substrate is made of one material selected from the group consisting of single-crystalline MnZn ferrite, $MnNiO_2$, $\alpha$—$Fe_2O_3$, and $ZrO_2$.

15. A magnetic head as claimed in claim 12, wherein the soft magnetic metal film is made of one magnetic alloy selected from the group consisting of Co-based amorphous magnetic alloy, Fe-C-based microcrystalline magnetic alloy, Fe—N-based microcrystalline magnetic alloy, and Fe—Si—Al-based magnetic alloy, and the substrate is made of one material selected from the group consisting of $MnNiO_2$, $\alpha$—$Fe_2O_3$, and $ZrO_2$.

16. A magnetic head as claimed in claim 12, wherein the soft magnetic metal film is made of Fe—Ni-based magnetic alloy and the substrate is made of one material selected from the group consisting of single-crystalline MnZn ferrite, $MnNiO_2$, and $\alpha$—$Fe_2O_3$.

17. A magnetic head as claimed in claim 12, which has a signal coil in the form of thin film.

18. A magnetic head as claimed in claim 12, wherein the soft magnetic metal film is made of one magnetic alloy selected from the group consisting of Co-based amorphous magnetic alloy, microcrystalline Fe-C-based magnetic alloy and Fe-Si-Al-based magnetic alloy, said Co-based amorphous magnetic alloy being one selected from the group consisting of $Co_{81-86}Nb_{11-14}Zr_{3-5}$ and $Co_{86-89}Ta_{6.5-9.0}Zr_{3.5-5.5}$, said microcrystalline Fe—C-based magnetic alloy being one selected from the group consisting of $Fe_{65-85}Ta_{5-15}C_{10-20}$ and $Fe_{60-80}Nb_{5-20}C_{10-20}$, and said Fe-Si-Al-based magnetic alloy being $Fe_{85-88}Al_{4-6}Si_{8-10}$.

* * * * *